US010430396B2

(12) United States Patent
Jarnikov

(10) Patent No.: US 10,430,396 B2
(45) Date of Patent: Oct. 1, 2019

(54) OBTAINING A VERSION OF AN ITEM OF CONTENT

(71) Applicant: IRDETO B.V., Hoofddorp (NL)

(72) Inventor: Dmitri Jarnikov, Hoofddorp (NL)

(73) Assignee: IRDETO B.V., Hoofddorp (NL)

(*) Notice: Subject to any disclaimer, the term of this patent is extended or adjusted under 35 U.S.C. 154(b) by 472 days.

(21) Appl. No.: 14/647,317

(22) PCT Filed: Nov. 26, 2012

(86) PCT No.: PCT/EP2012/004872
§ 371 (c)(1),
(2) Date: May 26, 2015

(87) PCT Pub. No.: WO2014/079471
PCT Pub. Date: May 30, 2014

(65) Prior Publication Data
US 2015/0302033 A1    Oct. 22, 2015

(51) Int. Cl.
*H04N 21/234*    (2011.01)
*H04N 21/835*    (2011.01)
(Continued)

(52) U.S. Cl.
CPC ........ *G06F 16/219* (2019.01); *H04L 65/4084* (2013.01); *H04L 65/607* (2013.01);
(Continued)

(58) Field of Classification Search
CPC ......... H04N 21/26258; H04N 21/6373; H04N 21/8358; H04N 21/23439; G06F 17/30309
See application file for complete search history.

(56) References Cited

U.S. PATENT DOCUMENTS 7,162,642 B2    1/2007   Schumann et al.
8,165,343 B1*   4/2012   McGowan .......... H04N 21/8358
                                              348/461
(Continued)

FOREIGN PATENT DOCUMENTS

CN    102377766 A    3/2012
CN    104937949 A    9/2015
(Continued)

OTHER PUBLICATIONS

International Search Report and Written Opinion cited in corresponding International Application No. PCT/EP2012/004872 dated Jul. 19, 2013.
(Continued)

*Primary Examiner* — Brian T Pendleton
*Assistant Examiner* — Frank Johnson
(74) *Attorney, Agent, or Firm* — Rimon PC

(57) ABSTRACT

A method of facilitating a device to obtain a version of an item of content. For each section of the item of content, a content distribution system is arranged to provide one or more versions of that section. At least one section includes a plurality of differently watermarked versions of that section. A request for a section of the item of content is received. If the requested section is a section for which the content distribution system is arranged to provide a plurality of differently watermarked versions of that section, a particular version is identified based on an identifier of the device and a response a response containing an indication of the particular version of the requested section is provided to the device. The response is arranged to cause the device to request the particular version of the requested section from a corresponding location on the content distribution system.

26 Claims, 5 Drawing Sheets

(51) Int. Cl.
    *G06F 16/21*     (2019.01)
    *H04L 29/06*     (2006.01)
    *H04N 21/2343*     (2011.01)
    *H04N 21/262*     (2011.01)
    *H04N 21/658*     (2011.01)
    *H04N 21/8358*     (2011.01)
    *H04N 21/858*     (2011.01)

(52) U.S. Cl.
    CPC . *H04N 21/23439* (2013.01); *H04N 21/26258* (2013.01); *H04N 21/6581* (2013.01); *H04N 21/8358* (2013.01); *H04N 21/8586* (2013.01)

(56) References Cited

U.S. PATENT DOCUMENTS

| | | | | |
|---|---|---|---|---|
| 8,925,023 | B2* | 12/2014 | Major | H04N 21/2323 386/295 |
| 9,756,289 | B2* | 9/2017 | Bickmore | H04N 21/42684 |
| 2005/0044223 | A1* | 2/2005 | Meyerson | G06F 21/10 709/225 |
| 2012/0042332 | A1* | 2/2012 | Wajs | H04L 9/088 725/31 |
| 2012/0045054 | A1* | 2/2012 | Main | H04N 21/23476 380/252 |
| 2012/0070128 | A1* | 3/2012 | Kato | G06F 21/10 386/259 |
| 2012/0089843 | A1* | 4/2012 | Kato | G06F 21/10 713/176 |
| 2012/0134650 | A1* | 5/2012 | Spitzlinger | H04N 5/85 386/260 |
| 2012/0308071 | A1* | 12/2012 | Ramsdell | H04N 1/32144 382/100 |
| 2013/0054972 | A1* | 2/2013 | Thorwirth | H04N 21/23439 713/176 |
| 2013/0219182 | A1* | 8/2013 | Barnes | G06T 1/0085 713/176 |
| 2013/0227293 | A1* | 8/2013 | Leddy | H04L 9/32 713/176 |
| 2013/0332971 | A1* | 12/2013 | Fisher | H04N 21/266 725/93 |
| 2017/0118537 | A1* | 4/2017 | Stransky-Heilkron | G06F 21/16 |

FOREIGN PATENT DOCUMENTS

| | | |
|---|---|---|
| EP | 2418869 A1 | 2/2012 |
| EP | 2429189 A1 | 3/2012 |
| EP | 2 923 498 A1 | 9/2015 |
| WO | 0219589 A1 | 3/2002 |
| WO | 2012095181 A1 | 7/2012 |
| WO | 2014/079471 A1 | 5/2014 |

OTHER PUBLICATIONS

First Office Action issued by the State Intellectual Property Office (SIPO) of China dated Sep. 18, 2017 in connection with corresponding Chinese Patent Application No. 201280078168.3, 25 pages.
International Preliminary Report on Patentability cited in corresponding International Application No. PCT/EP2012/004872 dated Jun. 4, 2015, 7 pages.
Communication pursuant to Article 94(3) EPC issued for European Patent Application No. 12791701.1 dated Feb. 19, 2018, 1 page.
Second Office Action issued by the State Intellectual Property Office (SIPO) of China dated Apr. 20, 2018 in connection with corresponding Chinese Patent Application No. 201280078168.3, 7 pages.

* cited by examiner

OBTAINING A VERSION OF AN ITEM OF CONTENT

The present application is the United States national stage of International Application No. PCT/EP2012/004872, filed Nov. 26, 2012, the entire content of which is incorporated herein by reference.

FIELD OF THE INVENTION

This invention relates to methods, systems and computer programs for facilitating a device to obtain a version of an item of content.

BACKGROUND OF THE INVENTION

Digital watermarking of content is very well known. Herein, the term "content" or "item of content" refers to data comprising one or more of video data, image data, audio data, media or multimedia data, text data, or any other form of content data.

There are many methods for performing digital watermarking of content but, in general, they all involve adding a watermark to an item of content. This involves embedding, or adding, watermark symbols (or a watermark codeword or payload data) into the original item of content to form a watermarked item of content. The watermarked item of content can then be distributed to one or more users (or recipients or receivers). The method used for adding a watermark to an item of content depends on the intended purpose of the watermark. Some watermarking techniques are designed to be "robust", in the sense that the embedded watermark can be successfully decoded even if the watermarked item of content has undergone subsequent processing (be that malicious or otherwise). Some watermarking techniques are designed to be "fragile", in the sense that the embedded watermark cannot be successfully decoded if the watermarked item of content has undergone subsequent processing or modification. Some watermarking techniques are designed such that the difference between the original item of content and the watermarked item of content is substantially imperceptible to a human user (e.g. the original item of content and the watermarked item of content are visually and/or audibly indistinguishable to a human user). Other criteria for how a watermark is added to an item of content exist.

Fingerprint watermarking is increasingly being used to trace or identify the source of (or a party/device involved in) the unauthorized distribution or publication or release of content. For this type of watermarking process, the watermarked content provided to a receiver contains a watermark specific to that receiver (i.e. the watermark carries or encodes a payload or codeword specific to that receiver and identifying that receiver). Each of the receivers receives a copy of the original item of content with their respective watermark embedded therein. Then, if an unauthorized copy of the item of content is located, the watermark can be decoded from that item of content and the receiver that corresponds to the decoded watermark can be identified as the source of (or a party/device involved in providing/releasing) the unauthorized copy.

FIG. 1 of the accompanying drawings schematically illustrates a system 100 providing content delivery. The system 100 comprises a device 102 (a user device or a receiver), a content provider system 104 and a network 106. The content provider system 104 is arranged to provide content (or an item of content) to the device 102 via the network 106. The content could be delivered from the content provider system 104 to the device 102 by streaming the content, by downloading the whole or a part of the content, or by any other suitable mechanism.

The network 106 may be any kind of network suitable for transmitting or communicating data between the content provider system 104 and the device 102 and, in particular, for communicating content from the content provider system 104 to the device 102. For example, the network 106 could comprise one or more of a local area network, a wide area network, a metropolitan area network, the internet, a wireless communications network, a cable network, a digital broadcast network, a satellite communication network, a telephone network, etc. The content provider system 104 may then communicate with the device 102 over the network 106 via any suitable communication mechanism/protocol in order to communicate data (such as content) between the content provider system 104 and the device 102.

The content provider system 104 may be any system that is suitable for communicating data with the device 102 via the network 106. The content provider system 104 comprises one or more processors 110, a memory 114, a network interface 112 and a data store 108. The network interface 112 is arranged to interface with the network 106 to enable the content provider system 104 to communicate with the network 106 (so that the content provider system 104 can then communicate with the device 102 via the network 106). The data store 108 may be a database or other storage mechanism/structure, and may store one or more items of content (or, as shall be described shortly, one or more sections of one or more items of content) that may be requested by the device 102 and that the content provider system 104 may then communicate to the device 102 via the network 106. The processor(s) 110 control the operation of the content provider system 104 and execute logic to carry out functionality of the content provider system 104, and may, as part of this processing, make use of the memory 114 to store and/or process data as is well-known in the art.

As examples, the content provider system 104 could be (part of) a headend system of a digital broadcast system (in which case the network 106 could comprise a terrestrial broadcast network or a satellite broadcast network) or the content provider system 104 could be (part of) a headend system of a cable network system (in which case the network 106 could comprise a cable network). The content provider system 104 could comprise one or more servers for transmitting, or providing access to, data over the internet (in which case the network 106 may comprise the internet). However, it will be appreciated that the content provider system 104 may take other forms instead and that the architecture illustrated in FIG. 1 is purely exemplary—in particular, the content provider system 104 may have one or more other components (not shown); alternatively, one or more of the components of the content provider system 104 shown in FIG. 1 may form part of a separate system accessible by the content provider system 104 or may act as separate resources for use by the content provider system 104.

The device 102 may be any system or apparatus that is suitable for communicating data with the content provider system 104 over the network 106. The device 102 comprises a network interface 120, one or more processors 116 and a memory 118. The network interface 120 is arranged to interface with the network 106 to enable the device 102 to communicate with the network 106 (so that the device 102 can then communicate with the content provider system 104 via the network 106). The processor(s) 116 control the operation of the device 102 and execute logic to carry out functionality of the device 102 and may, as part of this processing, make use of the memory 118 to store and/or process data as is well-known in the art.

The device 102 is arranged to execute a content player 122 (or a media rendering device/application/module). The content player 122 may process and output/render content that the device 102 has received from the content provider system 104 via the network 106—this output may be via one or more output devices not shown in FIG. 1 (such as speakers, displays/screens, etc.) of, or coupled to, the device 102.

The content player 122 may be implemented as hardware and/or as software executing on the processor(s) 116. As an example, the content player 122 may be a software media player (i.e. an audio and/or video player) such as Quick-Time, Windows Media Player, RealPlayer, etc.—this media player may be executed by the processor(s) 116, either as a standalone application or as a component embedded within another application (such as when a browser displays a webpage that includes a media player). The content player 122 may make use of dedicated content rendering hardware (such as decoding/decompression hardware).

Additionally, if the system 100 is to provide conditional access (CA) and/or digital rights management (DRM) functionality, the device 102 may be arranged to make use of one or more hardware devices (such as smartcards) and/or security software modules to carry out the CA and/or DRM functionality, as is well-known in the art.

As examples, the device 102 may comprise one or more of a set-top-box, a personal computer, a mobile telephone, a games console, a television, a radio, etc., but it will be appreciated that the device 102 may take other forms instead and that the architecture illustrated in FIG. 1 is purely exemplary—in particular, the device 102 may have one or more other components (not shown); alternatively, one or more of the components of the device 102 shown in FIG. 1 may form part of a separate system accessible by the device 102 or may act as separate resources for use by the device 102.

Although a single content provider system 104, a single network 106 and a single device 102 are illustrated in FIG. 1, it will be appreciated that the system 100 could comprise multiple content provider systems 104, multiple networks 106 and multiple devices 102, and that FIG. 1 has been simplified for ease of illustration. In particular, each content provider system 104 may communicate with multiple devices 102 over one or more networks 106, and each device 102 may communicate with multiple content provider systems 104 over one or more networks 106.

As is known in the art, the network 106 may comprise one or more caches 124, or one or more other network nodes, which may each store some or all of the same data as stored in the data store 108, or additional data not stored in the data store 108. When the device 102 submits a request for content to the content provider system 104 via the network 106, one or more of the caches 124 may be storing the requested data (in addition to, or in place of, the content provider system 104 storing that content)—when this happens, it may be more efficient (from the perspective of the content provider system 104), quicker and more bandwidth efficient for the requested content (or part of the requested content) to be provided to the device 102 from one or more of these caches 124 instead of from the content provider system 104 itself, in which case the network 106 may be arranged to provide the requested content (or that part of the requested content) to the device 102 from these caches 124 instead of from the content provider system 104 itself. Thus, the network 106, with its caches 124, along with the content provider system 104, may be viewed as forming a content distribution system 126. The device 102 may therefore interact with the content distribution system 126 to request and access content, and the content distribution system 126 may respond to the request by providing, or communicating, the requested content to the device 102. If caches 124 are not used, then the content distribution system 126 may be viewed simply as the content provider system 104 together with the network 106, or even just as the content provider system 104. The rest of this description shall refer to content (or sections of content) being stored at, and provided by, the content provider system 104, but it will be appreciated that content (or sections of content) may be stored at, and provided by, one or more caches 124 instead of, or in addition to, the content provider system 104, so that, in general, the content (or sections of content) may be stored at, and provided by, the content distribution system 126.

European patent application EP2429189 (the entire disclosure of which is incorporated herein by reference) discloses how to use a system such as the system 100 of FIG. 1 to carry out adaptive content delivery with watermarking (or fingerprinting). FIGS. 2 and 3 of the accompanying drawings depict how the system 100 of FIG. 1 may be arranged to carry out adaptive content delivery with watermarking (or fingerprinting) based on the methods and systems set out in EP2429189.

FIG. 2 schematically illustrates how an item of content 200 may be viewed as, or divided/separated into, a number of sections 202 (or content chunks). In FIG. 2, there are m sections 202 labelled $S_1, S_2, S_3, S_4, \ldots, S_m$. The sections 202 are usually non-overlapping and, when concatenated together in order (i.e. in their time-based ordering), form the item of content 200. Each section 202 may contain, or represent, a few seconds of content or a number of frames/fields of audio/video (or some other time-based quantity of content). The sections 202 may be of the same length, or may be of different lengths.

For one or more of the sections 202, there may be multiple versions (or variants) 204 of that section 202. A version 204 of a section 202 may be generated by encoding a copy of that section 202 (e.g. data compression, formatting, etc.) to achieve a corresponding quality level or a corresponding bandwidth requirement—the lower the quality level, the less bandwidth is required to communicate the section version 204 across the network 106 to the device 102. These different quality levels (or bandwidth characteristics) can be achieved by, for example, changing the resolution of video/image data (higher qualities may use higher resolutions), changing quantisation or sampling levels (higher qualities corresponding to less quantisation), etc., as is well-known in the art. In FIG. 2, for section $S_1$, there are n versions 204 of that section $S_1$ labelled $S_1Q_1, S_1Q_2, \ldots, S_1Q_n$, (where n≥1). Herein, a label "$S_iQ_j$" indicates the i-th section $S_i$ encoded to a quality level A version 204 of a section 202 may be generated by watermarking a copy of that section 202 to embed a corresponding message/payload/symbol therein. In FIG. 2, for section $S_2$, there are t (where t≥2) watermarked versions 204 of that section $S_2$ labelled $S_2M_1, S_2M_2, \ldots, S_2M_t$, that all have their own respective (relatively different) watermarks embedded therein, so that they are all distinct versions of the section $S_2$. Herein, a label "$S_iM_k$" indicates the k-th watermarked version of the i-th section $S_i$. The encoding and watermarking may be combined, so that a version 204 of a section 202 may be generated by watermarking a copy of that section 202 that has been encoded in a manner to achieve a corresponding quality level or a corresponding bandwidth requirement, in order to embed a corresponding message/payload/symbol therein. In FIG. 2, for section $S_4$, there are n quality levels for that section $S4$, and for each one of those n quality levels, there are t watermarked versions 204—these are labelled $S_4Q_1M_1, \ldots, S_4Q_nM_t$ (where n≥1 and t≥2). The watermarks used for any given quality level are different from each other. Herein, a label "$S_iQ_jM_k$" indicates the k-th watermarked version of the i-th section $S_i$ encoded at quality level $Q_j$. It will be appreciated that for different quality levels $Q_{j1}$ and $Q_{j2}$, the number of different watermarked versions of a section 202 encoded at those quality levels may be different from each other, and the watermarks embedded for one quality level may differ from the watermarks embedded for another quality level. Different sections 202 may have different numbers of versions 204 generated using (a) different numbers of quality levels (and the actual quality levels used may vary from section 202 to section 202) and/or (b) different numbers of watermarks (and the actual watermarks embedded may vary from section 202 to section 202).

Some sections 202 may only have a single version 204 (which could be the same as, or different from, that original section 202).

Thus, for each of the plurality of sections 202 of the item of content 200, the content provider system 104 is arranged to provide one or more versions 204 of that section. To achieve the fingerprint watermarking, there is at least one section 202 for which the content provider system 104 is arranged to provide a plurality of differently watermarked versions of that section 202 (be they versions $S_iM_k$ not encoded to different quality levels or versions $S_iQ_jM_k$ that are encoded to different quality levels).

The content provider system 104 may store the section versions 204 in the data store 108 (possibly along with the original content sections 202). As mentioned above, some or all of the section versions 204 may be stored in one or more of the caches 124.

If limited bandwidth is available for communicating content to the device 102, this may be detected by the content player 122 and the content player 122 can then choose to request a section version 204 with a lower bandwidth characteristic (i.e. a lower quality level). If/when more bandwidth becomes available for communicating content to the device 102, this may be detected by the content player 122 and the content player 122 can choose to request a section version 204 with a higher bandwidth characteristic (i.e. a higher quality level). These requests can be satisfied by the content provider system 104 providing the device 102 with the requested section version 204 encoded at a quality level appropriate to the requested bandwidth characteristic. Similarly, if limited bandwidth is available for communicating content to the device 102, this may be detected by the content provider system 104 and the content provider system 104 can then choose to provide to the device 102 a section version 204 with a lower bandwidth characteristic (i.e. a lower quality level). If/when more bandwidth becomes available for communicating content to the device 102, this may be detected by the content provider system 104 and the content provider system 104 can choose to provide to the device 102 a section version 204 with a higher bandwidth characteristic (i.e. a higher quality level). For example, the content player 122 may need to output/render content sections 202 to a user at a particular frequency. If the content player 122 detects that it is not receiving sections versions 204 from the content provider system 104 in time to be able to output/render the section versions 204 at that frequency, then the content player 122 may issue subsequent requests that are for section versions 204 at a lower quality than the content player 122 had previously been requesting. Similarly, if the content player 122 detects that it is has been receiving sections versions 204 from the content provider system 104 well in advance of the time at which those section versions 204 needed to be output/rendered, then the content player 122 may issue subsequent requests that are for section versions 204 at a higher quality than the content player 122 had previously been requesting.

To achieve fingerprint watermarking, a receiver (or a user or a device 102, or a group of receivers, users or devices 102) is provided access to a corresponding specific sequence (or set or group) of watermarked section versions 204 (be they versions $S_iM_k$ or $S_iQ_jM_k$). This specific sequence is different from sequences of watermarked section versions 204 used by other receivers. In particular, if there are W receivers in a population of receivers, then the w-th receiver (1≤w≤W) may be associated with a sequence of watermarked section versions $S_{i(w,1)}M_{k(w,1)}, S_{i(w,2)}M_{k(w,2)}, \ldots, S_{i(w,P)}M_{k(w,P)}$, where there are P watermarked section versions 204 in the specific sequence associated with the w-th receiver, and for 1≤p≤P, the p-th section version 204 in the specific sequence is $S_{i(w,p)}M_{k(w,p)}$ for some indices i(w,p) and k(w,p). This sequence of watermarked section versions $S_{i(w,1)}M_{k(w,1)}, S_{i(w,2)}M_{k(w,2)}, \ldots, S_{i(w,P)}M_{k(w,P)}$, (or the sequence of index pairs (i(w,1),k(w,1)), (i(w,2), k(w,2)), \ldots, (i(w,P),k(w,P))) is unique to the w-th receiver. It will be appreciated that section versions using different quality levels could be involved in the above sequence too. The device 102, upon receiving the section versions 204 from the content provider system 104, may combine (e.g. concatenate) the received section versions 204 to form a version of the original item of content 200. As this version of the original item of content 200 will use the specific sequence of watermarked section versions 204, it will be specific to that receiver associated with that device 104. Therefore, if that version of the original item of content 200 is distributed or released in an unauthorised manner, a watermark decoder can be used to identify that that specific sequence of watermarked section versions 204 was used to form that version of the original item of content 200, and hence identify that particular receiver.

As an example, the content provider system 104 may associate each receiver with a corresponding P-bit identification number—let the i-th bit of the identification number be b(i) (1≤i≤P). If P sections $S_1, \ldots, S_P$ are available and each of these sections 202 has corresponding differently watermarked sections versions $S_iM_0$ and $S_iM_1$ (1≤i≤P) (i.e. a version 204 watermarked with a symbol representing a "0" and a version 204 watermarked with a symbol representing a "1"), then a receiver's P-bit identification number may be associated with a sequence of watermarked sections corresponding to that P-bit identification number—in particular, the i-th section version 204 in that sequence will be $S_iM_{b(i)}$. For example, if P=6 and the identification number associated with a particular receiver is 110101, then that receiver may be provided access to watermarked section versions $S_1M_1$, $S_2M_1$, $S_3M_0$, $S_4M_1$, $S_5M_0$ and $S_6M_1$.

The use of an identification number in this way is not essential. The sequence of watermarked section versions 204 associated with a particular receiver could be randomly determined/generated. The sequence of watermarked section versions 204 need not be of fixed length (length P above) but could, for example, keep increasing in size as more and more section versions are provided to a receiver. The sequence of watermarked section versions 204 may be predetermined for a receiver or may be dynamically generated as and when the section versions 204 are being provided to the receiver. It will be appreciated that other mechanisms for determining a specific sequence of watermarked section versions 204 associated with a particular receiver could be used. However, in general, the content provider system 104 determines (or generates or calculates) the specific sequence of watermarked section versions 204 to associate with a particular receiver and may store data identifying (or from which can be calculated) that specific sequence of watermarked section versions 204 (e.g. the sequence of index pairs mention above, or a seed value used for randomly choosing a watermarked section version 204).

FIG. 3 schematically illustrates a process and architecture for the content provider system 106 to prepare the item of content 200 for adaptive content delivery with watermarking (or fingerprinting). This may be carried out by the processor(s) 110 executing one or more software processes; additionally or alternatively, this may be carried out by one or more hardware components of the content provider system 106 (not shown in FIG. 1).

The original item of content 200 is either received by an input 300 or is generated by a content generator 302. This original item of content 200 may contain a watermark (e.g. a watermark identifying information such as an owner of copyright in the content 200 or other metadata concerning the content 200)—such a watermark may have been embedded into the content 200 by another system (not shown in the figures).

The item of content 200 is provided to content encoders 304. In FIG. 3, two content encoders 304(1) and 304(2) are illustrated, and each content encoder 304 is arranged to encode the item of content 200 at a respective quality encoding level different from the quality encoding level used by the other content encoders 304. It will, of course, be appreciated that more than two content encoders 304 could be used, each arranged to encode the item of content 200 at its own respective quality encoding level different from the quality encoding levels used by the other content encoders 304. It will, additionally, be appreciated that a single content encoder 304 could be used so that, instead of encoding the item of content 200 at different quality levels in parallel (as is shown in FIG. 2), the item of content 200 may be encoded by the single content encoder 304 at a first quality level, then the item of content 200 may be encoded by the same content encoder 304 at a second quality level, and so on. A mixture of such encoder configurations is possible.

Each of these encoded items of content is split (or divided or separated) into a number of section versions 204 by respective section generators 306. As for the content encoders 304, in FIG. 3 two section generators 306(1) and 306(2) are illustrated, and each section generator 306 is arranged to generate section versions 204 from the encoded item of content 200 provided by a corresponding content encoder 304. It will, of course, be appreciated that more than two section generators 306 could be used, for example if more than two content encoders 304 are used. It will, additionally, be appreciated that a section generator 306 may generate section versions 204 out of encoded items of content 200 provided by multiple content encoders 304—for example, a single section generator 306 could be used in FIG. 3, where this single section generator 306 is arranged to generate a first set of section versions 204 from the encoded item of content 200 output by the first content encoder 304(1) and to then generate a second set of section versions 204 from the encoded item of content 200 output by the second content encoder 304(2), and so on. A mixture of such section generator configurations is possible.

A time alignment module 308 coordinates the generation of the section versions 204 by the section generators 306 so that the section versions 204 generated from respective encoded items of content 200 (output by the content encoders 304) are time-aligned, i.e. so that two section versions $S_iQ_{q1}$ and $S_iQ_{q2}$ for the i-th section 202 of the original item of content 200 encoded at different quality levels q1 and q2 will start at the same point within the original item of content 200 and will end at the same point within the original item of content 200. In this way, a version of the item of content 200 can be formed by selecting, for each section 202 of the item of content 200, a respective section version 204 and then concatenating those section versions 204 in order—different section versions 204 corresponding to the same section 202 of the item of content 200 can be interchanged as they are time-aligned. In other words, seamless switching between section versions 204 with different encoding quality can be carried out.

Each of the section versions 204 output by the section generators 306 is then supplied to a modifier module 307. The modifier module 307 is arranged to modify or process a section version 204 that it has received in order to create a modified section version 204. This modification may be, for example, by watermarking the received section version 204 so as to embed a corresponding symbol or payload into the received section version 204—this may be achieved by know watermarking techniques. In FIG. 3, four modifier modules 307(1)-307(4) are illustrated: a first modifier module 307(1) receives the section versions 204 output by the first section generator 306(1) and embeds a first symbol into those section versions 204 to output a first set of final section versions 204; a second modifier module 307(2) receives the section versions 204 output by the first section generator 306(1) and embeds a second symbol into those section versions 204 to output a second set of final section versions 204; a third modifier module 307(3) receives the section versions 204 output by the second section generator 306(2) and embeds the first symbol into those section versions 204 to output a third set of final section versions 204; and a fourth modifier module 307(4) receives the section versions 204 output by the second section generator 306(2) and embeds the second symbol into those section versions 204 to output a fourth set of final section versions 204. In this particular configuration, for an initial section $S_i$ of the original item of content 200, there will be generated four corresponding sections versions $S_iQ_1M_1$, $S_iQ_1M_2$, $S_iQ_2M_1$, $S_iQ_2M_2$. It will, of course, be appreciated that a different number of modifier modules 307 could be used. For example, if t watermarked versions of a section output by a section generator 306 are to be generated, then t modifier modules 307 could be implemented and coupled to that section generator 306. It will, additionally, be appreciated that a modified module 307 may be arranged to modify a section in a first manner to output a first section version 204 (e.g. by embedding a first watermark symbol) and may then modify that initial received section in a second manner to output a second section version 204 (e.g. by embedding a second different watermark symbol), and so on. A modifier module 307 may be arranged to receive sections generated by multiple section generators 306. A mixture of such modified module configurations is possible.

It will be appreciated that the functionality provided by the content encoders 304 and/or the section generators 306 and/or the modifier modules 307 may be implemented in whole or in part in together by a single module, rather than by separate modules as shown in FIG. 3.

The ordering in which the processing is illustrated in FIG. 3 may be changed. For example, the content sections 202 may be generated initially by one or more section generators 306 from the original item of content 200, and these sections 202 may then be passed to content encoders 304 which then encode the sections 202 to generate the section versions 204 and these may then be modified by modifier modules 307. Similarly, different watermarked versions of the original item of content 200 may be generated by one or more modifier modules 307, these modified items of content may then be encoded to different quality levels by respective content encoders 306, following which the sections versions 204 may be generated by one or more section generators 306 from the encoded modified items of content. Other arrangements are, of course, possible to result in the generation of the section versions 204.

The generated section versions 204 are stored in the data store 108.

Whilst FIG. 3 illustrates the generation of content versions 204 that are encoded at different quality levels and that have respective watermarks embedded therein (i.e. section versions $S_iQ_jM_k$), it will be appreciated that not all section versions 204 need to be watermarked, e.g. some of the section versions 204 output by the section generators 204 may be stored directly into the data store 108 in addition to, or possibly without being, passed to a modified module 307—in this way, section versions $S_iQ_j$ may be generated and stored in the data store 108. Similarly, it will be appreciated that not all section versions 204 need to be encoded to a particular quality level, e.g. a section generator 306 may receive the original item of content 200 instead of receiving an encoded item of content—in this way, section versions $S_iM_k$, or even just section versions $S_i$, may be generated and stored in the data store 108.

It will be appreciated, therefore, that the arrangement shown in FIG. 3 is purely exemplary and that alternatives are possible to achieve the types of section version generation discussed above with reference to FIG. 2.

A content format module 310 may determine, for each of the section versions 204, a corresponding reference (or identifier) with which that section version 204 can be identified, accessed and retrieved from the data store. The content format module 310 may also generate additional/other metadata 312 that can ultimately be used by the content player 122 to generate the references that the content player 122 will need to request and retrieve the appropriate/desired section versions 204. For example, this metadata 310 may take the form of a playlist (i.e. a file separate from the content and containing links or references to locations, such as URLs, for the content versions 204)—this playlist may then be provided to the content player 122 so that the content player 122 can select one or more section versions 204 identified in the playlist and then request those selected section versions 204 from the content provider system 104. Alternatively, the content provider system 104 may provide a content file to the device 102 containing one or more section versions 204, and the metadata 310 may take the form of a manifest (i.e. a portion of the content file provided to the device 102) that identifies where, within the content file, the section versions 204 are located. For performing fingerprint watermarking, the section versions 204 identified in the playlist or manifest provided to a receiver will include the specific sequence of watermarked section versions 204 associated with that receiver.

The structure of the playlist or manifest may sometimes have to depend on the content format. A new content format may, therefore, require updating of existing playlist generators (within the content format module 310) in order to be able to support that new content format. Moreover, some content formats do not use or support the concept of a playlist (e.g. MicroSoft Smooth Streaming)—supporting such content formats within the framework of the above adaptive content delivery with watermarking (or fingerprinting) may then require a special client side agent, running on the device 102, to support such content formats. This involves additional effort by users running the device 102, and is more difficult for providers of content (e.g. those operating the content provider system 106) to develop and maintain, especially as new formats are developed or existing formats are changed. These problems are exacerbated when the network caches 124 and other network nodes are involved in delivering content to the device 102.

SUMMARY OF THE INVENTION

According to a first aspect of the invention, there is provided a method of facilitating a device to obtain a version of an item of content, wherein, for each of a plurality of sections of the item of content, a content distribution system is arranged to provide one or more versions of that section, wherein there is at least one section for which the content distribution system is arranged to provide a plurality of differently watermarked versions of that section, the method comprising: receiving, from the device, a request for a section of the item of content, wherein the request also comprises an identifier of the device; if the requested section is a section for which the content distribution system is arranged to provide a plurality of differently watermarked versions of that section: identifying, based on the identifier of the device, a particular version out of the plurality of differently watermarked versions of the requested section; and providing the device with a response to the request, wherein the response contains an indication of the particular version of the requested section, and wherein the response is arranged to cause the device to request the particular version of the requested section from a corresponding location on the content distribution system.

The method may comprise: if the requested section is a section for which the content distribution system is not arranged to provide a plurality of differently watermarked versions of that section, providing the device with a response to the request, wherein the response contains an indication of a particular version of the requested section, wherein the response is arranged to cause the device to request that particular version of the requested section from a corresponding location on the content distribution system.

The indication of the particular version of the requested section may comprise an indication of the corresponding location. The response may comprise a URL redirect to the corresponding location.

In some embodiments, there is at least one section of the plurality of sections for which the content distribution system is arranged to provide a plurality of versions of that section encoded at respective quality levels, wherein the received request comprises an indication of a desired quality level, and wherein the particular version of the requested section indicated in the response is a version of the requested section encoded at a quality level corresponding to the desired quality level.

In some embodiments, for at least one of the sections for which the content distribution system is arranged to provide a plurality of versions of that section encoded at respective quality levels, there is a quality level for which the content distribution system is arranged to provide a plurality of differently watermarked versions of that section encoded at that quality level.

In some embodiments, the content distribution system comprises a content provider system acting as an origin for the item of content, wherein the method is carried out by a server acting as a proxy server for the content provider system.

In some embodiments, the identifying is arranged so that, in response to a sequence of requests received from the device for sections of the item of content, the corresponding sequence of particular watermarked versions of sections identified for the device is unique to the device.

In some embodiments, the identifying is arranged so that, in response to a sequence of requests received from the device for sections of the item of content, the device is identifiable from the corresponding sequence of particular watermarked versions of sections identified for the device.

According to a second aspect of the invention, there is provided a system arranged to carry out a method according to the first aspect of the invention.

In some embodiments, the content distribution system comprises a content provider system acting as an origin for the item of content, wherein the system is a proxy server for the content provider system.

According to a third aspect of the invention, there is provided a method for a content provider system to enable a device to obtain a version of an item of content, wherein, for each of a plurality of sections of the item of content, a content distribution system is arranged to provide one or more versions of that section, wherein there is at least one section for which the content distribution system is arranged to provide a plurality of differently watermarked versions of that section, the method comprising the content provider system providing to the device a plurality of references, each reference corresponding to a respective one of the plurality of sections of the item of content and identifying a proxy server for the content provider system as a location from which to request that corresponding section of the item of content, wherein the proxy server is the above-mentioned system.

In some embodiments, for each reference, the content distribution system is arranged to provide a plurality of differently watermarked versions of the section corresponding to that reference. In some embodiments, the content provider system provides to the device a plurality of further references, each further reference corresponding to a respective one of the plurality of sections of the item of content and identifying the content provider system as a location from which to request that corresponding section of the item of content, wherein for each further reference, the content distribution system is not arranged to provide a plurality of differently watermarked versions of the section corresponding to that further reference.

In some embodiments, the references provided to the device by the content provider system include references corresponding to sections of the item of content for which the content distribution system is arranged to provide a plurality of differently watermarked versions as well as references corresponding to sections of the item of content for which the content distribution system is not arranged to provide a plurality of differently watermarked versions.

According to a fourth aspect of the invention, there is provided a system arranged to carry out a method according to the third aspect of the invention.

According to a fifth aspect of the invention, there is provided a content distribution system comprising a first system according to the second aspect of the invention and a second system according to the fourth aspect of the invention.

According to a sixth aspect of the invention, there is provided a computer program which, when executed by a processor, causes the processor to carry out any one of the above methods. The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 4:
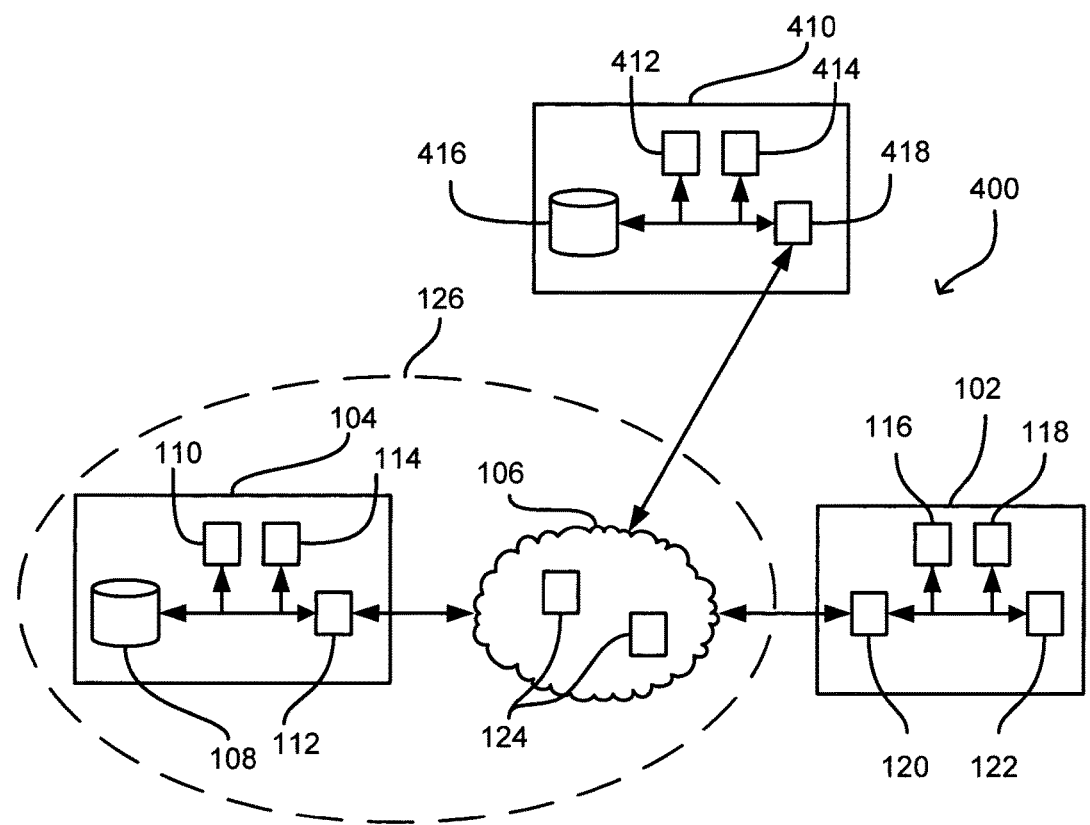
FIG. 4 schematically illustrates a system according to an embodiment of the invention.

FIG. 4 schematically illustrates a system 400 according to an embodiment of the invention. The system 400 is the same as the system 100 illustrated in FIG. 1, except with the following differences discussed below. Therefore, for the purposes for clarity and conciseness, functionality in common between the system 400 and the system 100 shall not be repeated below.

The system 400 comprises a fingerprint system 410. The fingerprint system 410 may be any system that is suitable for communicating data with the device 102 and the content provider system 104 via the network 106. The fingerprint system 410 comprises one or more processors 412, a memory 414, a network interface 418 and a data store 416. The network interface 418 is arranged to interface with the network 106 to enable the fingerprint system 410 to communicate with the network 106 (so that the fingerprint system 410 can then communicate with the device 102 and/or the content provider system 104 via the network 106). The data store 416 may be a database or other storage mechanism/structure, and, as shall be discussed in more detail below, may store data identifying location(s) at which are stored (or from which can be retrieved or accessed) one or more watermarked section versions 204 of one or more items of content 200. The processor(s) 412 control the operation of the fingerprint system 410 and execute logic to carry out functionality of the fingerprint system 410, and may, as part of this processing, make use of the memory 414 to store and/or process data as is well-known in the art.

The fingerprint system 410 may take the form of, for example, one or more servers. The fingerprint system 410 may be part of the content provider system 104 or may be separate from the content provider system 104. As shall be described below, the fingerprint system 410 acts as a proxy for the content provider system 104.

Figure 1:
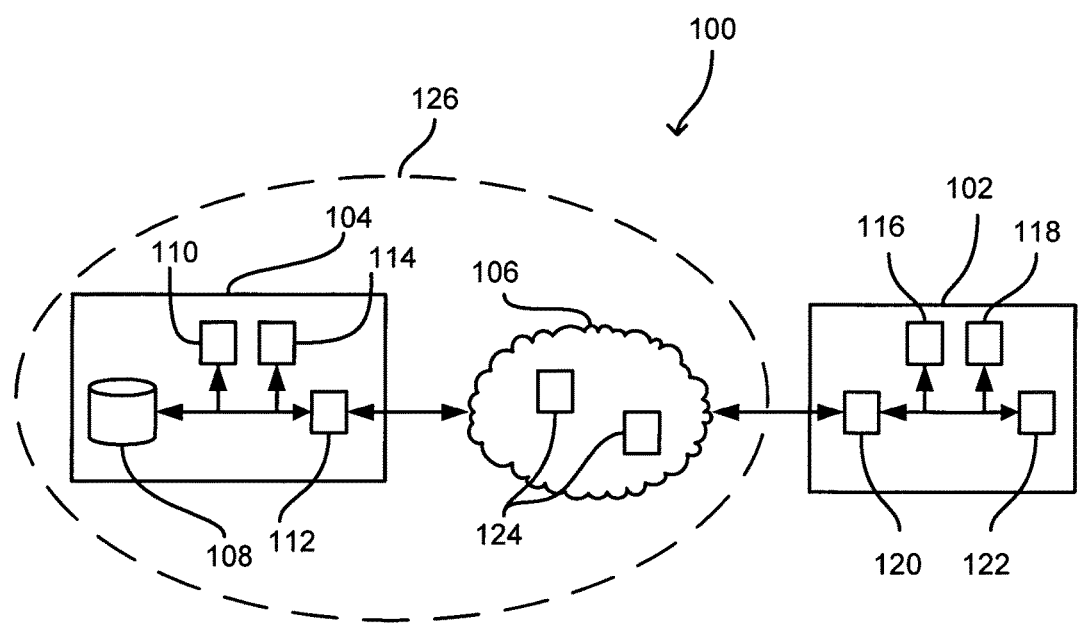
FIG. 1 schematically illustrates a system providing content delivery.
Figure 2:
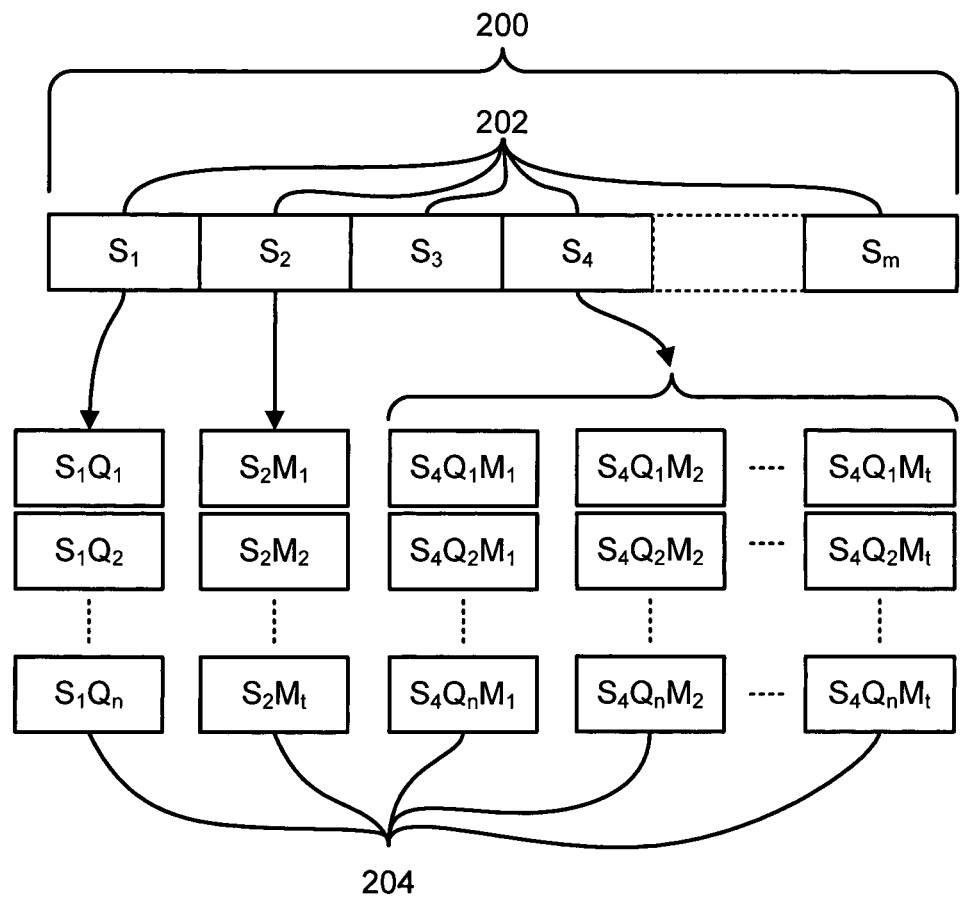
FIG. 2 schematically illustrates how an item of content may be divided into a number of sections.
Figure 3:
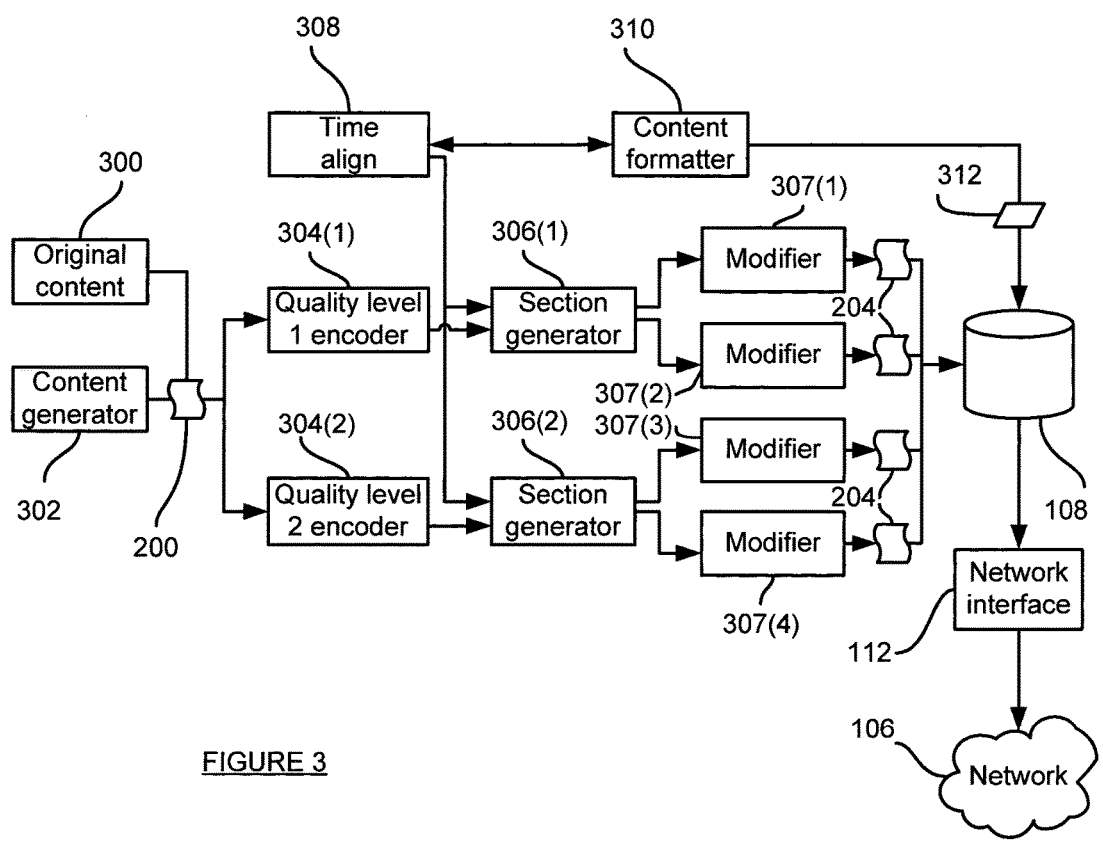
FIG. 3 schematically illustrates a process and architecture for a content provider system to prepare an item of content for adaptive content delivery with watermarking (or fingerprinting)

In the system 100 of FIG. 1, the content provider system 104 provided the device 102 with a playlist (separate from content) or a manifest (provided with a content file) that already identified a specific sequence of watermarked section versions 204 for the receiver (i.e. for that device 102 or the user of that device 102). Thus, the playlist of manifest provided to the device 102 is unique to the receiver. In contrast, in embodiments of the present invention, the content provider system 104 provides a playlist of manifest to the device 102, where this playlist or manifest identifies the "basic-level" sections $S_i$ (or quality-level encoded section versions $S_iQ_j$) and contains a reference to the fingerprint system 410. In particular, the playlist or manifest generated by the content provider system 104 in the system 100 would have identified specific watermarked sections versions $S_{i(w,p)}M_{k(w,p)}$ (where p indicates the p-th watermarked section version 204; w is the w-th receiver in a population of receivers; and k (and possibly i too) is an index that is a function of w and p)—the device 102 would then have requested, from the content provider system 104, those identified watermarked sections versions $S_{i(w,p)}M_{k(w,p)}$ (or versions encoded at appropriate quality levels $S_{i(w,p)}Q_j M_{k(w,p)}$). In contrast, in embodiments of the present invention, the playlist or manifest generated by the content provider system 104 in the system 400 identifies the content sections 202 $S_i$ (or quality-level encoded section versions $S_iQ_j$) and a location or reference or identification (e.g. as part of a URL) of the fingerprint system 410. The device 102 then requests, from the identified fingerprint system 410, content sections $S_i$ (or versions encoded at appropriate quality levels $S_iQ_j$) and the fingerprint system 410 provides a response to the device 102 that causes the device 102 to retrieve the requested section (or section version 204) from an indicated location. To this end, the fingerprint system 410 may store, in its database 416, locations at which sections 202 or section versions 204 are stored (or from which they can be retrieved or accessed) or may be able to generate, from a request for a section, a corresponding location (e.g. one identifying the content provider system 104). The request provided by the device 102 to the fingerprint system 410 includes an identification of the device 102 (or a user of the device 102). If the requested section is one for which there are watermarked section versions 204 (or for which this particular device 102 is to receive a watermarked section version 204), then the fingerprint system 410 can use the identification of the device 102 to identify a particular watermarked section version 204 of the requested section 202—the response provided by the fingerprint system 410 causes the device 102 to retrieve that watermarked section version 204 from the location indicated in the response. On the other hand, if the requested section is one for which there are not watermarked section versions 204 (or for which this particular device 102 is not to receive a watermarked section version 204), then the response provided by the fingerprint system 410 causes the device 102 to retrieve the requested (unwatermarked) section version 204 from the location indicated in the response.

Whilst FIG. 4 illustrates a single fingerprint system 410, it will be appreciated that the system 400 could make use of multiple fingerprint systems 410 and that a playlist or manifest could reference or identify one or more such fingerprint systems 410 for any given item of content 200.

This overview shall be described in more detail below. However, it will be appreciated that the playlist or manifest provided to the population of receivers (or devices 102) from the content provider system 104 may be the same for all receivers (or devices 102). This helps reduce the overall processing/delivery requirements for the content provider system 104. Moreover, providing such a playlist or manifest (one that references the fingerprint system 400 which provides responses in the manner described herein) helps overcome the above-mentioned problems with the system 100.

Figure 5:
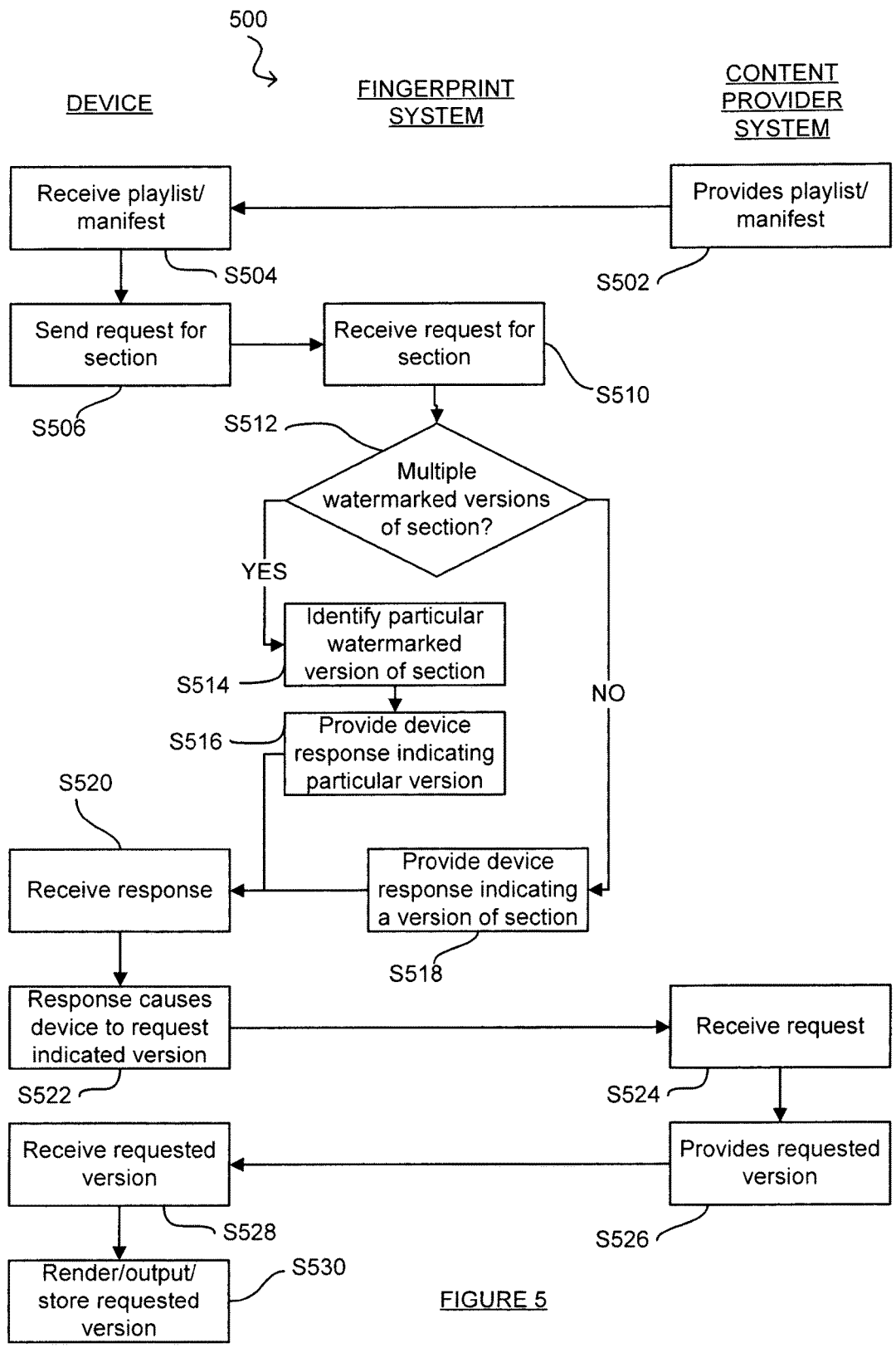
FIG. 5 is a flowchart schematically illustrating a method carried out by the system according to an embodiment of the invention.

FIG. 5 is a flowchart schematically illustrating a method 500 carried out by the system 400 according to an embodiment of the invention.

At a step S502, the content provider system 104 provides the device 102 with a playlist. As mentioned above, the playlist identifies one or more sections 202 of the original item of content 200, i.e. sections $S_i$, or possibly one of more versions 204 of those sections 202 encoded at one or more quality levels, i.e. section versions $S_iQ_j$. In this sense, the sections $S_i$ and section versions $S_iQ_j$ may be considered to be analogous, i.e. they are sections of content that are identified and that the device 102 may subsequently request. The identifications of the sections 102 or section versions 204 in the playlist do not themselves identify a specific watermarked section version $S_iM_k$ or $S_iQ_jM_k$—in other words, the playlist does provided by the content provider system 104 to the device 102 does not identify or indicate which fingerprint watermark is to be associated with that device 102.

Additionally, the playlist identifies the fingerprint system 410 as the location from which to request versions of the sections $S_i$ or quality encoded section versions $S_iQ_i$ identified in the playlist.

The above may be achieved, for example, by the playlist containing a URL for each of the sections $S_i$ or quality encoded section versions $S_iQ_j$ identified in the playlist, with the URL pointing to the fingerprint system 410 and identifying the corresponding section $S_i$ or quality encoded section version $S_iQ_j$ (e.g. as parameter encoded within the URL or as part of the address itself). For example, the playlist could contain URLs:

http://example.com/content_title/section1
http://example.com/content_title/section2
http://example.com/content_title/section3
http://example.com/content_title/section4
http://example.com/content_title/section5 that identify five sections ("section1", . . . ,"section5") of an item of content 200 (entitled "content_title"), with the fingerprint system 410 having an address of http://example.com.

The content provider system 104 may provide the playlist to the device 102 in response to having received a request from the device 102 (e.g. if a user of the device 102 has navigated to a webpage hosted by the content provider system 104 to request access to an item of content 200). The content provider system 104 may provide the playlist to the device 102 as part of an automated content provision schedule (e.g. if a user of the device 102 is a subscriber to a content provision scheme). It will be appreciated that the content provider system 104 may provide the playlist to the device 102 for other reasons and in response to other stimuli, but that this is not important for embodiments of the invention.

The playlist may be delivered or communicated to the device 102 via the network 106.

At a step S504, the device 102 receives the playlist from the content provider system 104.

At a step S506, the content player 122 at the device 102 begins, or is in the process of, playing out (or rendering or outputting) content corresponding to the received playlist. In order to be able to achieve this, the content player 122 uses the received playlist to identify one or more next sections 202 (or quality encoded section versions 204) that it needs. In particular, as discussed above, the sections 202 of the item of content 200 form an ordered series or sequence such that rendering the sections 202 in that order results in rendering the item of content 200—the content player 202 may, therefore, determine from the playlist that it needs one or more next or subsequent sections 202 (or quality encoded section versions 204) in order to begin, or to continue, rendering the item of content 200.

The device 102 then requests, from the fingerprint system 410 identified in the playlist, the sections 202 (or quality encoded section versions 204) that the content player 122 has determined that it needs. For example, if the playlist contains the URLs:

http://example.com/content_title/section1
http://example.com/content_title/section2
http://example.com/content_title/section3
http://example.com/content_title/section4
http://example.com/content_title/section5 and the content player 122 determines that it needs "section3" as the next section 202 in order to continue rendering the item of content 200 (entitled "content_title"), then the device 102 may send a request/get message to a server associated with the domain "example.com" (as set out in the URL for "section 3"), with the message identifying the section 202 that is needed (e.g. by specifying the URL http://example.com/content_title/section3). If the content player 122 determines that it needs a particular quality level encoded version of "section3" as the version 204 of the next section 202, then the content player 122 may generate a URL from the URL associated with that next section 202, where the generated URL specifies the desired quality level, e.g.

http://example.com/content_title/quality_level2/section3 or
http://example.com/content_title/section3/quality_level2 or
http://example.com/contenttitle/section3?q=2 if the desired quality level is "2"—a request/get message may then be sent to a server associated with the domain "example.com" (as set out in the URL for "section 3"), with the message identifying the section 202 and quality level that is needed (e.g. by specifying the URL http://example.com/content_title/section3?q=2).

An another example, the playlist may contains URLs that already reference specific quality levels, for example:

http://example.com/content_title/quality_level1/section1
http://example.com/content_title/quality_level2/section1
http://example.com/content_title/quality_level1/section2
http://example.com/content_title/quality_level2/section2
http://example.com/content_title/quality_level1/section3
http://example.com/content_title/quality_level2/section3
http://example.com/content_title/quality_level1/section4
http://example.com/content_title/quality_level2/section4
http://example.com/content_title/quality_level1/section5
http://example.com/content_title/quality_level2/section5 if the content player 122 determines that it need "section3" as the next section 202, and encoded at quality level "quality_level2" in order to continue rendering the item of content 200 (entitled "content_title"), then the device 102 may send a request/get message to a server associated with the domain "example.com" (as set out in the URL for "section 3"), with the message identifying the section 202 and quality level that is needed (e.g. by specifying the URL http://example.com/content_title/quality_level2/section3).

In addition to identifying a section 202 (or a quality encoded section version 204), the request sent from the device 102 to the fingerprint system 410 comprises an identifier of the device 102 making the request. This identifier could be, for example, a predetermined identification number associated with the device 102, e.g. an identification number previously registered with the content provider system 104 when the device 102 was first initialized. Alternatively, the identifier could be an address (such as an Internet address) of the device 102. Other types of identification of the device 102 could be used.

At a step S510, the fingerprint system 410 receives the request from the device 102.

At a step S512, the fingerprint system 410 determines whether the requested section 202 (or the requested quality encoded section version 204) is one for which the content provider system 104 is arranged to provide a plurality of differently watermarked versions of that section 202 (or differently watermarked versions of that quality encoded section version 204).

For example, as mentioned above, the data store 416 may store data identifying location(s) at which are stored (or from which can be retrieved or accessed) one or more watermarked section versions 204 of one or more items of contents 200. This data may have been provided to the fingerprint system 410 from the content provider system 104 when the content provider system 104 initially generated the watermarked section versions 204. The fingerprint system 410 may inspect the data store 416 to determine whether the requested section 202 (or the requested quality encoded section version 204) is one for which it has a record of their being a plurality of watermarked section versions 204. Alternatively, the fingerprint system 410 may, upon receiving the request from the device 102, query the content provider system 104 to determine whether the requested section 202 (or a quality encoded section versions 204) is one for which it has a record of their being a plurality of watermarked section versions 204.

In some embodiments, the determination made at the step S512 is dependent upon the identification of the device 102. For example for some devices 102, the sequence of watermarked section versions that will be used to uniquely identify that device 102 may include the requested section 202 (or the requested quality encoded section version 204), in which case the determination made at the step S512 will be based on whether the requested section 202 (or the requested quality encoded section version 204) is one for which the fingerprint system 410 has a record of their being a plurality of watermarked section versions 204. However, if the sequence of watermarked section versions that will be used to uniquely identify that device 102 does not include the requested section 202 (or the requested quality encoded section version 204), then the determination made at the step S512 may be that the requested section 202 (or the requested quality encoded section version 204) is not one for which there is plurality of watermarked section versions 204.

If a determination is made that the requested section 202 (or the requested quality encoded section version 204) is one for which the content provider system 104 is arranged to provide a plurality of differently watermarked versions of that section 202, then processing continues at a step S514; otherwise, processing continues at a step S518.

At the step S514, the fingerprint system 410 identifies a particular watermarked version 204 of the requested section 202 (or of the requested quality encoded section version 204), this being the section version 204 that the device 102 will be instructed to obtain and which will, therefore, form part of the version of the item of content 200 that the content player 122 will assemble and render. In other words, the particular watermarked version 204 that is identified will form part of the specific sequence of watermarked section versions 204 associated with that device 102 (or content player 122). Thus, the identification of the particular watermarked version 204 is based on the received identification of the device 102 (or content player 122).

The fingerprint system 410 may identify the particular watermarked section version 204 in the same manner as described above with respect to the prior content provider system 104 of the system 100. Thus, it is not the content provider system 104 that associates specific sequences of watermarked section versions 104 with receivers but it is the fingerprint system 410 that carries this out instead. The fingerprint system 410 may store, in the data store 416, information defining, or from which can be derived, these associations—this information can be subsequently used when analysing a suspect item of content 200 to identify the receiver to which that suspect item of content 200 was initially provided.

Alternatively, the association of specific sequences of watermarked section versions 104 with receivers may initially be performed by the content provider system 104, and the content provider system 104 may then provide the fingerprint system 410 with information (which can be stored in the data store 416) defining, or from which can be derived, these associations.

Additionally, if the request received from the device 102 identifies a desired quality level, then the response may contain an indication of a watermarked version 204 of that section 202 encoded at quality level corresponding to the desired quality level.

At a step S516, the fingerprint system 410 provides a response to the device 102. The response contains an indication of the identified particular watermarked version 204. Thus, if the initial request received from the device 102 identified a section $S_i$ or a quality encoded section version $S_iQ_j$, then the response will identify a particular corresponding watermarked section version $S_iM_k$ or $S_iQ_jM_k$.

Additionally, the response is arranged to cause the device 102 to (automatically) request the identified particular watermarked section version 204 from a corresponding location on the content provider system 104. To this end, the indication of the identified particular watermarked version 204 may be an indication of the corresponding location—for example, the response may be a URL identifying the particular watermarked version 204 that is obtainable from the location specified in the URL. The response may cause the automatic request by, for example, the response being an HTTP redirect (as is known in the art). Alternatively, the fingerprint system 410 may be arranged to provide more specific (bespoke) responses, and the device 102 may be particularly configured to interpret such responses.

At the step S518, the fingerprint system 410 provides a response to the device 102. The response contains an indication of a particular version 204 of the requested section 202 (or of the requested quality encoded section version 204). For example, if the request received from the device 102 identifies a particular section 202 and a desired quality level, then the response may contain an indication of a version 204 of that section 202 encoded at quality level corresponding to the desired quality level. Alternatively, the response may contain an indication of the initially requested section 202 (or a quality encoded section versions 204).

Additionally, the response is arranged to cause the device 102 to (automatically) request the identified particular section version 204 from a corresponding location on the content provider system 104. This may be achieved in the same manner as set out above from the step S516.

At a step S520, the device 102 receives the response from the fingerprint system 410.

As discussed, at a step S522, the response received from the fingerprint system 410 causes the device 102 to request the particular section version 204 indicated in the response received from the fingerprint system 410 from the corresponding location on the content provider system 104.

At a step S524, the content provider system 104 receives the request from the device 102.

At a step S526, the content provider system 104 provides the requested section version 204 (from the corresponding location on the content provider system 104).

At a step S528, the device 102 receives the section version 204 from the content provider system 104.

At a step S530, the device 102 renders or outputs the received section version 204.

Whilst FIG. 5 has been described with reference to the device 102 carrying out certain actions, it will be appreciated that one or more of those actions may be carried out, and be particular to, the content player 122 itself (e.g. the request provided at the step S506 may contain an identification of the content player 122 instead of, or possibly in addition to, an identification of the device 102).

Whilst FIG. 5 has been described with reference to the content player 122 rendering the content (and therefore requesting sections 202 for the purposes of rendering corresponding section versions 204), the content player 122 may request sections 202 for other purposes, e.g. for forming and storing a version of the item of content 200 from the received section versions 204, so that that version of the item of content 200 can be rendered at a later stage.

Whilst FIG. 5 has been described above with reference the playlist identifying the fingerprint system 410 as a location from which each section 202 (or a version 204 of each section 202) is to be retrieved, it will be appreciated that not all sections 202 (or versions 204 of sections 202) need to be requested from the fingerprint system 410. The playlist could, therefore contain references to the content provider system 104 for one or more sections 202 for which watermarked versions 204 are not to be requested (or are not available) whilst identifying the fingerprint system 410 as a location from which versions 204 of other sections 202 are to be requested as set out above.

Whilst FIG. 5 has been described above with reference to a playlist, the same applies equally to embodiments in which a manifest is used instead of a playlist.

As mentioned previously, whilst embodiments of the invention have been described with reference to the sections 202 and/or section versions 204 being stored at, and provided by, the content provider system 104, it will be appreciated that the sections 202 and/or section versions 204 may be stored at, and provided by, one or more caches 124 instead of, or in addition to, the content provider system 104, so that, in general, the sections 202 and/or section versions 204 may be stored at, and provided by, the content distribution system 126.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of facilitating a device to obtain a version of an item of content from a content distribution system, wherein the content distribution system comprises a plurality of nodes each respectively storing one or more versions of one or more sections of one or more items of content, wherein, for each of a plurality of sections of said item of content, the content distribution system is arranged to provide one or more versions of that section, wherein there is at least one section of said item of content for which the content distribution system is arranged to provide a plurality of differently watermarked versions of that section, the method comprising:
 receiving, from the device, a request specifying a section of said item of content, wherein the request also comprises an identifier of the device;
 determining that the section specified in the request is a section for which the content distribution system is arranged to provide a plurality of differently watermarked versions of that section; and
 in response to said determining that the section specified in the request is a section for which the content distribution system is arranged to provide a plurality of differently watermarked versions of that section:
  identifying, based on the identifier of the device included in the request, a particular watermarked version out of the plurality of differently watermarked versions of the section specified in the request; and
  providing the device with a response to the request, wherein the response contains an indication of the particular watermarked version of the section specified in the request identified in said identifying step, and wherein the response is arranged to cause the device to request the particular watermarked version of the section specified in the request from a corresponding node the content distribution system.

2. The method of claim 1, comprising:
 receiving, from the device, a further request specifying a further section of said item of content, wherein the further request also comprises the identifier of the device;
 if the further section specified in the further request is a section for which the content distribution system is not arranged to provide a plurality of differently watermarked versions of that section, providing the device with a response to the further request, wherein the response contains an indication of a particular version of the further section specified in the further request, wherein the response is arranged to cause the device to request that particular version of the further section specified in the further request from a corresponding node of the content distribution system.

3. The method of claim 1, in which the indication of the particular watermarked version of the section specified in the request comprises an indication of the corresponding node.

4. The method of claim 3, in which the response comprises a URL redirect to the corresponding node.

5. The method of claim 1, wherein there is at least one section of the plurality of sections for which the content distribution system is arranged to provide a plurality of versions of that section encoded at respective quality levels,
 wherein the received request comprises an indication of a desired quality level, and
 wherein the particular watermarked version of the section specified in the request indicated in the response is a version of the section specified in the request encoded at a quality level corresponding to the desired quality level.

6. The method of claim 5, wherein for at least one of the sections for which the content distribution system is arranged to provide a plurality of versions of that section encoded at respective quality levels, there is a quality level for which the content distribution system is arranged to provide a plurality of differently watermarked versions of that section encoded at that quality level.

7. The method of claim 1, wherein the content distribution system comprises a content provider system acting as an origin for the item of content, wherein the method is carried out by a server acting as a proxy server for the content provider system.

8. The method of claim 1, wherein the identifying is arranged so that, in response to a sequence of requests received from the device for sections of the item of content, the corresponding sequence of particular watermarked versions of sections identified for the device is unique to the device.

9. The method of claim 1, wherein the identifying is arranged so that, in response to a sequence of requests received from the device for sections of the item of content, the device is identifiable from the corresponding sequence of particular watermarked versions of sections identified for the device.

10. A method for a content provider system to enable a device to obtain a version of an item of content from a content distribution system, wherein the content distribution system comprises a plurality of nodes each respectively storing one or more versions of one or more sections of one or more items of content, wherein, for each of a plurality of sections of said item of content, the content distribution system is arranged to provide one or more versions of that section, wherein there is at least one section of said item of content for which the content distribution system is arranged to provide a plurality of differently watermarked versions of that section, the method comprising the content provider system providing to the device a plurality of references, each reference corresponding to a respective one of the plurality of sections of the item of content and identifying a proxy server for the content provider system as a location from which to request that corresponding section of the item of content, wherein the proxy server is a system comprising one or more processors arranged to:
  receive, from the device, a request specifying a section of said item of content, wherein the request also comprises an identifier of the device;
  determine that the section specified in the request is a section for which the content distribution system is arranged to provide a plurality of differently watermarked versions of that section and
  in response to determining that the section specified in the request is a section for which the content distribution system is arranged to provide a plurality of differently watermarked versions of that section:
    identify, based on the identifier of the device included in the request, a particular watermarked version out of the plurality of differently watermarked versions of the section specified in the request; and
    provide the device with a response to the request, wherein the response contains an indication of the particular watermarked version of the section specified in the request, and wherein the response is arranged to cause the device to request the particular watermarked version of the section specified in the request from a corresponding node of the content distribution system.

11. The method of claim 10, wherein for each reference, the content distribution system is arranged to provide a plurality of differently watermarked versions of the section corresponding to that reference.

12. The method of claim 11, comprising the content provider system providing to the device a plurality of further references, each further reference corresponding to a respective one of the plurality of sections of the item of content and identifying the content provider system as a node from which to request that corresponding section of the item of content, wherein for each further reference, the content distribution system is not arranged to provide a plurality of differently watermarked versions of the section corresponding to that further reference.

13. The method of claim 10, wherein the references provided to the device by the content provider system include references corresponding to sections of the item of content for which the content distribution system is arranged to provide a plurality of differently watermarked versions as well as references corresponding to sections of the item of content for which the content distribution system is not arranged to provide a plurality of differently watermarked versions.

14. A system for facilitating a device to obtain a version of an item of content from a content distribution system, wherein the content distribution system comprises a plurality of nodes each respectively storing one or more versions of one or more sections of one or more items of content, wherein, for each of a plurality of sections of said item of content, the content distribution system is arranged to provide one or more versions of that section, wherein there is at least one section of said item of content for which the content distribution system is arranged to provide a plurality of differently watermarked versions of that section, the system comprising one or more processors arranged to:
  receive, from the device, a request specifying a section of said item of content, wherein the request also comprises an identifier of the device;
  determine that the section specified in the request is a section for which the content distribution system is arranged to provide a plurality of differently watermarked versions of that section and
  in response to determining that the section specified in the request is a section for which the content distribution system is arranged to provide a plurality of differently watermarked versions of that section:
    identify, based on the identifier of the device included in the request, a particular watermarked version out of the plurality of differently watermarked versions of the section specified in the request; and
    provide the device with a response to the request, wherein the response contains an indication of the particular watermarked version of the section specified in the request, and wherein the response is arranged to cause the device to request the particular watermarked version of the section specified in the request from a corresponding node of the content distribution system.

15. The system of claim 14, wherein the one or more processors are arranged to:
  receive, from the device, a further request specifying a further section of said item of content, wherein the further request also comprises the identifier of the device;
  if the further section specified in the request is a section for which the content distribution system is not arranged to provide a plurality of differently watermarked versions of that section, provide the device with a response to the further request, wherein the response contains an indication of a particular version of the further section specified in the further request, wherein the response is arranged to cause the device to request that particular version of the further section specified in the further request from a corresponding node of the content distribution system.

16. The system of claim 14, in which the indication of the particular watermarked version of the section specified in the request comprises an indication of the corresponding node.

17. The system of claim 16, in which the response comprises a URL redirect to the corresponding node.

18. The system of claim 14, wherein there is at least one section of the plurality of sections for which the content distribution system is arranged to provide a plurality of versions of that section encoded at respective quality levels,
wherein the received request comprises an indication of a desired quality level, and
wherein the particular watermarked version of the section specified in the request indicated in the response is a version of the section specified in the request encoded at a quality level corresponding to the desired quality level.

19. The system of claim 18, wherein for at least one of the sections for which the content distribution system is arranged to provide a plurality of versions of that section encoded at respective quality levels, there is a quality level for which the content distribution system is arranged to provide a plurality of differently watermarked versions of that section encoded at that quality level.

20. The system of claim 14, wherein the content distribution system comprises a content provider system acting as an origin for the item of content, wherein the system comprises a server acting as a proxy server for the content provider system.

21. The system of claim 14, wherein said identifying is arranged so that, in response to a sequence of requests received from the device for sections of the item of content, the corresponding sequence of particular watermarked versions of sections identified for the device is unique to the device.

22. The system of claim 14, wherein said identifying is arranged so that, in response to a sequence of requests received from the device for sections of the item of content, the device is identifiable from the corresponding sequence of particular watermarked versions of sections identified for the device.

23. A content distribution system comprising a plurality of nodes each respectively storing one or more versions of one or more sections of one or more items of content, and one or more processors arranged to:
for each of a plurality of sections of an item of content, provide one or more versions of that section, wherein there is at least one section for which the content distribution system is arranged to provide a plurality of differently watermarked versions of that section; and
enable a device to obtain a version of the item of content by providing to the device a plurality of references, each reference corresponding to a respective one of the plurality of sections of the item of content and identifying a proxy server for the content provider system as a location from which to request that corresponding section of the item of content, wherein the proxy server is a system comprising one or more processors arranged to:
receive, from the device, a request specifying a section of the item of content, wherein the request also comprises an identifier of the device;
determining that the section specified in the request is a section for which the content distribution system is arranged to provide a plurality of differently watermarked versions of that section and
in response to said determining that the section specified in the request is a section for which the content distribution system is arranged to provide a plurality of differently watermarked versions of that section:
identify, based on the identifier of the device included in the request, a particular watermarked version out of the plurality of differently watermarked versions of the section specified in the request; and
provide the device with a response to the request, wherein the response contains an indication of the particular watermarked version of the section specified in the request, and wherein the response is arranged to cause the device to request the particular watermarked version of the section specified in the request from a corresponding node of the content distribution system.

24. The system of claim 23, wherein for each reference, the content distribution system is arranged to provide a plurality of differently watermarked versions of the section corresponding to that reference.

25. The system of claim 24, wherein the one or more processors of the content provider system are arranged to provide to the device a plurality of further references, each further reference corresponding to a respective one of the plurality of sections of the item of content and identifying the content provider system as a node from which to request that corresponding section of the item of content, wherein for each further reference, the content distribution system is not arranged to provide a plurality of differently watermarked versions of the section corresponding to that further reference.

26. The system of claim 23, wherein the references provided to the device by the content provider system include references corresponding to sections of the item of content for which the content distribution system is arranged to provide a plurality of differently watermarked versions as well as references corresponding to sections of the item of content for which the content distribution system is not arranged to provide a plurality of differently watermarked versions.

* * * * *